US009255683B2

(12) United States Patent
Brendle

(10) Patent No.: US 9,255,683 B2
(45) Date of Patent: Feb. 9, 2016

(54) LIGHT MODULE OF A LIGHTING DEVICE OF A MOTOR VEHICLE

(71) Applicant: Automotive Lighting Reutlingen GmbH, Reutlingen (DE)

(72) Inventor: Matthias Brendle, Tuebinger (DE)

(73) Assignee: AUTOMOTIVE LIGHTING REUTLINGER GMBH, Reutlingen (DE)

( * ) Notice: Subject to any disclaimer, the term of this patent is extended or adjusted under 35 U.S.C. 154(b) by 0 days.

(21) Appl. No.: 13/793,873

(22) Filed: Mar. 11, 2013

(65) Prior Publication Data

US 2013/0242585 A1 Sep. 19, 2013

(30) Foreign Application Priority Data

Mar. 13, 2012 (DE) ......................... 10 2012 203 929

(51) Int. Cl.
*B60Q 1/08* (2006.01)
*F21S 8/10* (2006.01)

(52) U.S. Cl.
CPC ........... *F21S 48/125* (2013.01); *F21S 48/1159* (2013.01); *F21S 48/1258* (2013.01); *F21S 48/1317* (2013.01); *F21S 48/1388* (2013.01); *F21S 48/145* (2013.01); *F21S 48/1747* (2013.01)

(58) Field of Classification Search
CPC . F21S 48/2281; F21S 48/125; F21S 48/1291; G02B 3/0037; B60Q 1/04
USPC ......................................... 362/537, 487, 543
See application file for complete search history.

(56) References Cited

U.S. PATENT DOCUMENTS

| | | | | |
|---|---|---|---|---|
| 7,156,544 B2 * | 1/2007 | Ishida | 362/538 |
| 7,178,960 B2 * | 2/2007 | Ishida | 362/545 |
| 7,387,416 B2 | 6/2008 | Tsukamoto et al. | |
| 7,993,043 B2 * | 8/2011 | Sazuka et al. | 362/509 |
| 8,038,334 B2 * | 10/2011 | Ishida | 362/539 |
| 8,425,097 B2 * | 4/2013 | Yamamoto | 362/539 |
| 2001/0019486 A1 * | 9/2001 | Thominet | 362/543 |
| 2004/0136203 A1 * | 7/2004 | Gasquet | 362/543 |
| 2006/0120094 A1 * | 6/2006 | Tsukamoto et al. | 362/518 |

(Continued)

FOREIGN PATENT DOCUMENTS

| | | |
|---|---|---|
| DE | 102006044640 A1 | 3/2008 |
| DE | 102010021937 A1 | 12/2011 |

*Primary Examiner* — Anh Mai
*Assistant Examiner* — Matthew J Peerce
(74) *Attorney, Agent, or Firm* — Howard & Howard Attorneys PLLC

(57) ABSTRACT

A light module of a lighting device comprises one passing-light sub-module for production of a dimmed-light distribution below a horizontal "light/dark" boundary, one high-beam sub-module for production of a light distribution above the boundary, a common projection-lens system for production of an overall light distribution, and one element deflecting a course of light beams of the sub-module(s) before it falls on the system. To realize the smallest system and a reduction of non-homogeneities in the overall light distribution in a region of the boundary, a majority of the light beams of the high-beam sub-module falls on a common segment of the system as a majority of the light beams of the passing-light sub-module, a smaller portion of the light beams of the high-beam sub-module falls on another segment of the system, and the system exhibits a deflector that deflects at least a portion of the light beams falling on the other segment downward.

10 Claims, 9 Drawing Sheets

(56) References Cited

U.S. PATENT DOCUMENTS

2007/0268713 A1* 11/2007 Chinniah et al. .............. 362/507
2011/0038168 A1* 2/2011 Schug ........................... 362/465
2011/0141754 A1* 6/2011 Hikmet et al. ................ 362/464
2011/0222304 A1* 9/2011 Tatsukawa .................... 362/518
2013/0058114 A1* 3/2013 Reiners ......................... 362/510
2013/0135885 A1* 5/2013 Anzai ........................... 362/511
2013/0229705 A1* 9/2013 Suzuki .......................... 359/361

* cited by examiner

LIGHT MODULE OF A LIGHTING DEVICE OF A MOTOR VEHICLE

CROSS-REFERENCE TO RELATED APPLICATION

This application is based upon and claims priority to German Patent Application 10 2012 203 929.5 filed on Mar. 13, 2012.

BACKGROUND OF INVENTION

1. Field of Invention

The invention relates to a light module of a lighting device of a motor vehicle. The light module includes at least one passing-light sub-module for production of a dimmed-light distribution for the most part below an essentially horizontal "light/dark" boundary and at least one high-beam sub-module for the most part above the "light/dark" boundary. The light module includes further a common projection-lens system for dimming of light beams of all sub-modules in front of the motor vehicle for production of a desired resulting overall light distribution of the light module. Finally, the light module includes further a deflecting element that deflects a light-beam course of at least one of the sub-modules so that a deviated course of the beam paths of this at least one sub-module arises.

2. Description of Related Art

Such a light module is, for example, known from U.S. Pat. No. 7,387,416 B2. The lighting device described there includes an upper passing-light module with an LED light source and a primary lens system designed as a reflector for the bundling of the light beams emitted by the LED. The bundled light beams are obscured at least partially by a diaphragm arrangement arranged in the beam path. The diaphragm arrangement extends essentially on a horizontal plane including an optical axis of the light module and exhibits a reflecting surface as well as a front edge with a specified contour. The light passing by the diaphragm arrangement is projected in front of the motor vehicle by a projection-lens system designed as a projection lens for production for the resulting overall light distribution in the case of the passing-light module of a dimmed-light distribution (e.g., a dimmed-light distribution, fog-light distribution, or the like). In the process, the projection lens projects the front edge of the diaphragm arrangement as a "light/dark" boundary in front of the motor vehicle. Further, the known light module has a lower high-beam sub-module that likewise includes an LED light source and a primary lens system constructed as a reflector. The light beams emitted by the high-beam sub-module come upon a deflecting element that deviates all light-beam courses of the high-beam module and deflects them in the direction of the projection lens. A mirrored underside of the diaphragm arrangement serves as a deflecting element, wherein the high-beam sub-module and the deflecting element are constructed and coordinated in such a way that the light beams of the high-beam sub-module fall on the projection-lens system after being deflected by the deflecting element.

Therefore, in the case of the light module known from U.S. Pat. No. 7,387,416 B2, the beam path above and below the "light/dark" boundary is divided by two reflecting areas of the diaphragm arrangement, the two reflecting areas tapering sharply on the local plane of the projection lens to a knife edge. This edge has the contour of the desired "light/dark" boundary and is projected through the lens onto the lane.

In the case of the known light module, the high-beam sub-module, strictly speaking, does not produce any full-value high-beam light distribution. Instead, a full-value high-beam light distribution arises only through an overlaying or supplementing of the partial light distributions produced by the passing-light sub-module and the high-beam module. The high-beam module, thus, produces only a partial light distribution as part of the resulting overall light distribution, wherein the partial light distribution illuminates a region essentially above the "light/dark" boundary of the passing-light distribution. Hence, the partial light distributions of the passing-light sub-module and of the high-beam module overlay or supplement one another in the resulting overall light distribution to a full-value high-beam light distribution. In the process, however, the following problems arise: In the case of the overlaying of the partial light distributions of the passing-light sub-module and high-beam module in the region of the "light/dark" boundary of the passing-light distribution, a significantly visible, dark stripe arises in the overall light distribution. Due to the chromatic aberration of the projection lens, this dark stripe can significantly disturb the overall light distribution. Another problem arises from the fact that the partial light distribution produced by the high-beam module exhibits a significantly higher brightness than the dimmed-light distribution produced by the passing-light sub-module. Thus, in the resulting overall light distribution, a significantly more visible brightness gradient arises in the region of the "light/dark" boundary, which is likewise disturbing. The difficulty, thus, consists in separating the beam paths of the different light functions in such a way that, in the case of the passing light, no (or hardly any) light is scattered beyond the "light/dark" boundary since, otherwise, there can be a blinding of other road users and, in the case of the high-beam light, no dark or colored line remains in the area of the passing-light, "light/dark" boundary.

From JP 2006-107 875 A (JP 42-89268 B2), a light module with a passing-light sub-module and a high-beam module is likewise known. However, the known light module lacks a deflecting element to deflect a light-beam course from at least one of the sub-modules before it falls on the projection-lens system. Moreover, the high-beam module produces a full-value high-beam light distribution without requiring an overlaying with the passing-light distribution produced by the passing-light sub-module. In the case of this sub-module, the full-value high-beam light distribution is not produced by an overlaying or supplementing of the partial light distributions of the passing-light sub-module and the high-beam module, but, rather, solely by the high-beam module. In this respect, the problems addressed by the invention also do not arise with JP 2006-107 875 A—in particular, the problem of a dark shadow in the resulting overall light distribution in the region of the "light/dark" boundary of the passing-light distribution as well as chromatic aberrations in this region and high "brightness gradient" values). In the light-exit direction according to the projection-lens system constructed as the projection lens in the case of the known light module, an additional reflector is arranged, which deflects the light beams of the high-beam light distribution downward since these, otherwise, would appear far above the horizon. However, for styling reasons, such a reflector cannot be realized in practice ordinarily.

Further, a light module is known from DE 10 2010 021 937 A1, which likewise includes at least one passing-light sub-module and at least one high-beam module. Each of the sub-modules includes at least one LED light source as well as at least one primary lens system constructed as a light-conducting body and that bundles the light beams emitted by the LEDs by refraction and/or total internal reflection. Certain rear boundaries in the light-conducting body serve as deflecting elements to deflect the light-beam course of the sub-module assigned to the light-conducting body before it hits the projection-lens system. A full-value high-beam light distribution is likewise produced in the case of this known light module by an overlaying or supplementing of the partial light distributions of the passing-light sub-modules and of the high-beam modules. To solve the aforementioned problem, which is addressed by the invention, it is proposed that light-decoupling surfaces of the primary lens system of the high-beam module constructed as light-conducting bodies be arranged in the direction of an optical axis of the lighting device offset to the rear to light-decoupling surfaces of the primary lens system of the passing-light sub-module constructed as light-conducting bodies. In addition, a light-exit angle of the partial light distribution produced by the high-beam module is selected to be so large that the light distribution produced by the high-beam module overlays the passing-light distribution at least in the region of its "light/dark" boundary. In this way, the "light/dark" boundary should completely disappear in the event of the operation of the lighting device to produce a full-value high-beam light distribution as a resulting overall light distribution. However, in the process, it is disadvantageous that the light beams of the partial light distributions of the passing-light sub-module and the high-beam sub-module predominantly pass through different regions of the projection lens. This requires the use of a projection lens with a relatively large diameter whereas, in modern lighting devices (for reasons of space and design), frequently, the smallest possible projection lens (for example, the projection lens with the smallest possible diameter) must be used.

Proceeding from the described related art, the invention addresses the problem of ensuring that, in the case of a light module in which the partial light distributions of a passing-light sub-module and of a high-beam module overlay or supplement to a full-value high-beam light distribution as a resulting overall light distribution, in the resulting overall light distribution, an essentially horizontal "light/dark" boundary of the passing-light distribution is no longer visible or only very faintly visible and simultaneously facilitating the use of the smallest possible projection-lens system.

SUMMARY OF INVENTION

The invention overcomes disadvantages in the related art in a light module of a lighting device of a motor vehicle. The light module comprises at least one passing-light sub-module for production of a dimmed-light distribution substantially below an essentially horizontal "light/dark" boundary, at least one high-beam sob-module for production of a light distribution substantially above the "light/dark" boundary, a common projection-lens system for dimming of light beams of the sub-modules in front of the motor vehicle for production of a desired resulting overall light distribution of the light module, and at least one deflecting element that deflects a course of the light beams of at least one of the sub-modules before the light-beam course falls on the projection-lens system. The sub-modules and deflecting element are constructed and aligned relative to one another such that a majority of the light beams of the sub-module falls on a common segment of the projection-lens system as a majority of the light beams of the sub-module, a smaller portion of the light beams of the sub-module falls on another segment of the projection-lens system, and the projection-lens system deflects at least a portion of the light beams falling on the other segment downward.

To solve the problem of the related art, proceeding from the light module of the initially named type, it is proposed that the sub-modules and the deflecting element are arranged and aligned relative to one another in such a way that a majority of the light beams of the at least one high-beam module fall on an identical segment of the projection-lens system as well as a majority of the light beams of the passing-light sub-module, that a smaller portion of the light beams of the high-beam module fall on another segment of the projection-lens system, and that the projection-lens system deflects at least a part of the light beams falling on the other segment of the projection-lens system downward.

In accordance with the invention, it is proposed to have as much light as possible from the passing-light sub-module and the high-beam module fall on the same segment of the projection-lens system so that a majority of the passing-light and high-beam light beams use the same segment of the projection-lens system and the projection-lens system can be constructed as small as possible. Simultaneously, only as much light of the high-beam module falls on another segment of the projection-lens system lying outside of the named segment as is necessary to reduce or even completely eliminate the shadows, color fringes, and high gradient values present there. The majority of the light beams of the passing-light sub-module and of the high-beam module that fall on the named segment of the projection-lens system are, thus, projected without a deflection downward in front of the motor vehicle to produce the resulting overall light distribution in the form of the full-value high-beam light distribution. Only the small portion of the light beams of the high-beam module that is supposed to be deflected downward to blur the "light/dark" boundary falls on the projection-lens system outside of the named segment. Thus, it is possible to deflect downward only the small portion of light beams of the high-beam module (and not the majority of the light beams of the passing-light and high-beam modules that fall on the named common segment of the projection-lens system).

Due to the fact that, in the case of the invention, a majority of the light produced by the passing-light sub-module and the high-beam sub-module falls on the same segment of the projection-lens system, the projection-lens system, can be constructed especially small. Due to the fact that only a small portion of the light beams of the high-beam module falls on a segment of the projection-lens system outside of the common segment of passing-light beams and high-beam light beams, this small portion of the light beams of the high-beam module can be purposefully deflected downward by itself without the majority of the passing-light beams and high-beam light beams falling on the common segment of the secondary lens system being deflected. The most important statutory provisions (extending in vertical and horizontal directions, brightness values, etc.) for the full-value high-beam light distribution are produced by the majority of the passing-light beams and high-beam light beams falling on the common segment of the projection-lens system. Due to the small portion of the high-beam light beams that fall on the other segment of the projection-lens system, only the overall light distribution in the region of the passing-light, "light/dark" boundary is cosmetically improved. This permits a highly exact production of the resulting overall light distribution as a complete high-beam light distribution and simultaneously the elimination or reduction of disturbing properties of the overall light distribution in the region of the "light/dark" boundary (shadows, color fringes, high "brightness gradient" values, etc.).

In accordance with an advantageous improvement of the invention, it is proposed to have the segment of the projection-lens system upon which the majority of the light beams of the sub-modules falls be arranged around art optical axis of the projection-lens system. Thus, in the case of the common segment of the projection-lens system, it is a matter of an essentially central segment arranged around the optical axis of the projection-lens system. The at least one passing-light sub-module, the at least one high-beam module, and the deflecting element of the light module are, hence, designed and aligned relative to one another in such a way that the light beams they produce largely fall on the central segment of the projection-lens system.

In accordance with an embodiment of the invention, it is proposed to arrange the other segment of the projection-lens system, upon which the smaller portion of the light beams of the high-beam module falls, at a distance to an optical axis of the projection-lens system. The other segment of the projection-lens system is, in an embodiment, provided in a peripheral region of the projection-lens system. In an embodiment, the other segment in an upper and/or lower peripheral region of the projection-lens system is arranged above or below the optical axis. In particular, when the other segment is arranged above the optical axis, the light beams of the high-beam module can especially effectively be lowered through the portion of the light beams passing through this segment since the lowering of the light beams becomes all the more difficult the farther down the light beams fall on the projection-lens system.

In an embodiment, the at least one passing-light sub-module and/or the at least one high-beam module include(s) at least one LED light source for emitting light to produce the corresponding light distributions and at least one primary lens system for the bundling of the emitted light before it falls on the projection-lens system. Such light modules are also referred to as "LED modules." The primary lens system can, for example, be constructed as a reflector that mirrors the light beams emitted by the light sources at a reflection surface directed toward the light source in the conventional manner. The reflector can in the process exhibit an "ellipsoid" form. However, it is also conceivable to have the reflector exhibit a so-called "free form" in which case, proceeding from an "ellipsoid" form, the reflector form is modified in places to achieve a desired light distribution. Also, in the case of a "free form" the greatest part of the reflector surface exhibits an "ellipsoid" form. The primary lens system can, however, also be constructed as a light-conducting body made of a transparent material into which the light emitted by the light sources is coupled, at least partially totally reflected to outer boundaries of the body, and then decoupled. Such a light-conducting body is, for example, known in the form of a so-called "auxiliary lens system." Finally, the primary lens system can also be constructed in any other form (for example, in the form of a combination of a reflector with a light-conducting body).

In accordance with a further embodiment of the invention, it is proposed to have the deflecting element including a deflecting mirror with an edge and the projection-lens system reproducing the edge of the deflecting mirror as the "light/dark" boundary in front of the motor vehicle. Depending on the arrangement and alignment of the sub-module (the beam path of which is deviated by the deflecting element), the deflecting element is arranged and aligned in the light module in such a way that, after falling on the deflecting element, the light emitted by the sub-module is deflected in the direction of a specified segment of the projection-lens system. The deflecting element can simultaneously also fulfill the function of a diaphragm arrangement that shadows the light emitted by the passing-light sub-module at least partially and the edge of which is projected by the projection-lens system as the "light/dark" boundary of the passing-light distribution in front of the motor vehicle.

As an alternative, it is proposed that the deflecting element include a prism with an edge and the projection-lens system reproduce the edge of the prism as the "light/dark" boundary in from of the motor vehicle. A prism arranged in the beam path of the light beams emitted by the passing-light sub-module (in an embodiment, on the local plane of the projection-lens system) can purposefully direct the light beams passing through to a specified segment of the projection-lens system so that a deviated beam course of the light beams produced by the passing-light sub-module arises. As an alternative or in addition, a prism can also be arranged in the light beams emitted by the high-beam module, the prism directing the light beams emitted by the high-beam module largely on the common segment of the projection-lens system. If a prism is arranged both in the beam path of the passing-light sub-module as well as in the beam path of the high-beam module, the deflecting element can also be constructed as a so-called "double prism" including two prisms on top of one another that converge along their upper edges in the region of the tip of the prisms. In an embodiment, in the process, it is a matter of prisms with triangles as cross-sectional surfaces. However, prisms with triangle-like cross-sectional surfaces also come into consideration, which, for example, are achieved by triangles with carved prism surfaces. The cross-section of the prisms should extend proceeding from the contour of the "light/dark" boundary at least to the opposite side.

The projection-lens system can be constructed as a reflector—in particular, a paraboloid-shaped reflector—that projects the beam courses produced by the sub-modules for producing the resulting overall light distribution of the light module in front of the motor vehicle. As an alternative, in accordance with a further embodiment of the invention, it is proposed that the projection-lens system be constructed as a projection lens.

The projection lens exhibits in another segment, upon which the smaller portion of the light beams of the high-beam sub-module falls, in an embodiment, the local increase of the refractive power of the projection lens. This embodiment is interesting when the named other segment of the projection lens is located above the optical axis of the lens—in particular, at an upper peripheral region of the lens. These can, for example, be achieved by varying the light-entry surface and/or the light-exit surface of the lens in the named other segment of the projection lens in such a way that the light beams coming from the high-beam module fall flatter (that is, at a greater angle measured with respect to a surface normal one) on the light-entry or light-exit surface. This corresponds to prism angles increasing upward and smaller focal distances in the upper lens zones. This causes a stronger refraction of the light beams (in the present case, downward).

As an alternative or in addition, it is proposed that the projection lens in the other segment, upon which the smaller portion of the light beams of the high-beam module falls, exhibits the local reduction of the refractive power of the projection lens. This embodiment is interesting when the named other segment lies below the optical axis of the lens—in particular, in a lower peripheral region of the lens. These can be realized by having a light-entry surface and/or a light-exit surface of the projection lens in the named other segment changed in such a way that the light beams originating from the high-beam module fall more steeply (that is, in a smaller angle) on the light-entry surface or light-exit surface. As a result, the refractive power is reduced, and the light beams originating and falling in the lower peripheral region on the projection lens are deflected through the lens less strongly upward so that they are, as a result, deflected farther downward than would be the case if the deflector were not present.

Other objects, features, and advantages of the invention are readily appreciated as it becomes more understood while the subsequent detailed description of embodiments of the invention is read taken in conjunction with the accompanying drawing thereof.

BRIEF DESCRIPTION OF EACH FIGURE OF DRAWING OF INVENTION

FIG. 1 shows an inventive light module of a lighting device of a motor vehicle;

FIG. 2*a* shows a first operating mode of the light module from FIG. 1;

FIG. 2*b* shows a second operating mode of the light module from FIG. 1;

FIG. 2*c* shows a third operating mode of the light module from FIG. 1;

FIGS. 3*a* through 3*d* show different embodiments of a deflecting element of the light module from FIG. 1;

FIGS. 4*a* through 4*c* show different light-beam courses through a projection lens for clarification of the inventive embodiment of the projection-lens system;

FIGS. 5*a* through 5*d* show different views of an embodiment of a deflecting lens of the light module from FIG. 1;

FIGS. 6*a* through 6*d* show different views of another embodiment of a deflecting lens of the light module from FIG. 1;

FIGS. 7*a* through 7*e* show different views of another embodiment of a deflecting lens of the light module from FIG. 1;

FIGS. 8*a* through 8*c* show different views of another embodiment of a deflecting lens of the light module from FIG. 1;

FIGS. 9*a* and 9*b* show different possibilities of an alignment of a sub-module of the light module from FIG. 1;

DETAILED DESCRIPTION OF EMBODIMENTS OF INVENTION

Figure 1:
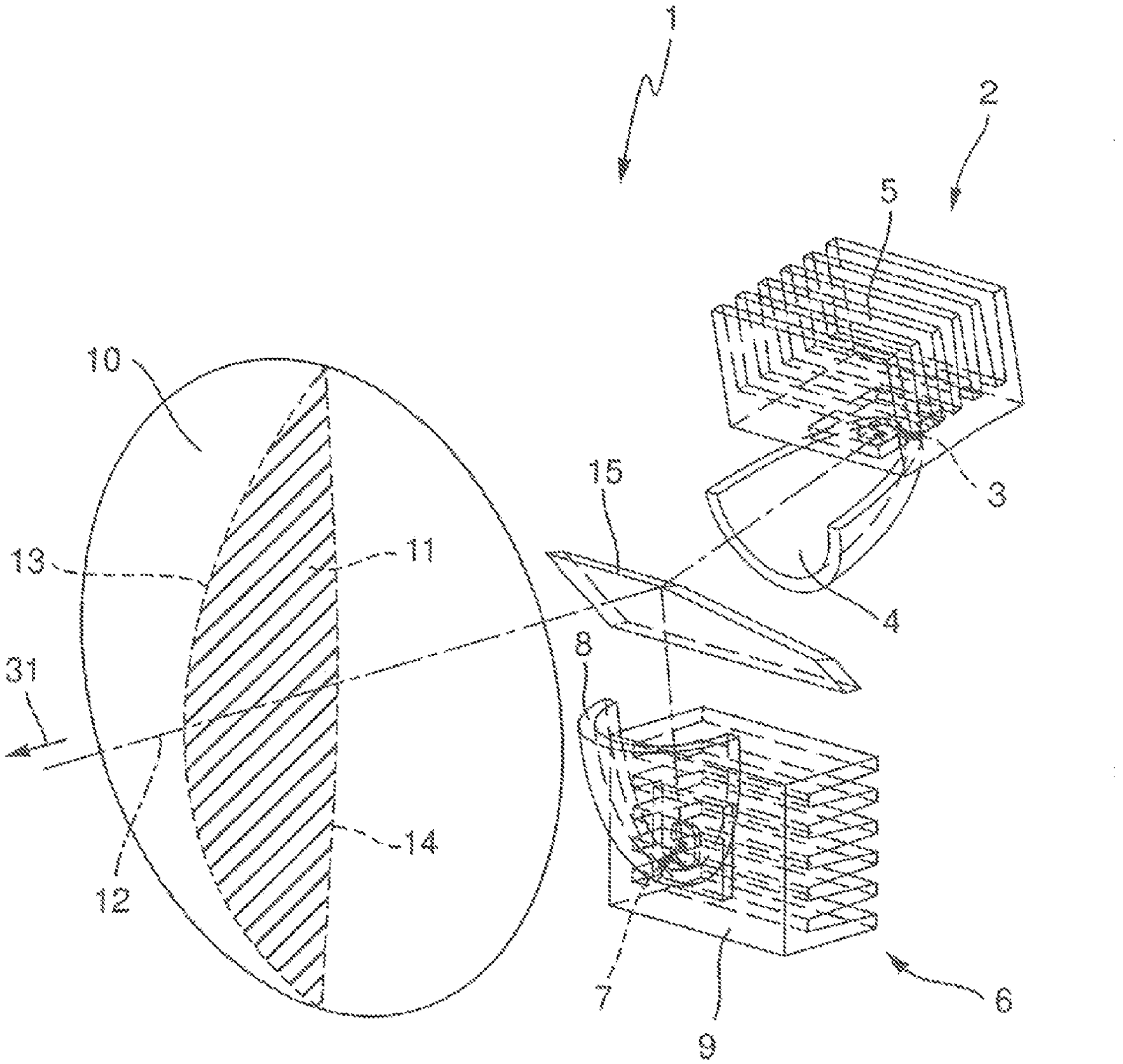

A light module in accordance with an embodiment of the invention is generally indicated at 1 in FIG. 1. The light module 1 is part of a lighting device (headlights or lamp) of a motor vehicle and can be arranged either alone or together with other light or lamp modules in a housing of the lighting device (not shown in the figure).

The light module 1 is, in an embodiment, part of a headlight of a motor vehicle. In the embodiment, the light module 1 includes a passing-light sub-module 2 for production of a dimmed-light distribution with an essentially horizontally running "light/dark" boundary. The passing-light sub-module 2 includes at least one light source 3—for example, in the form of a semi-conductor light source (in particular, an LED). The light emitted from the light source 3 is bundled by a primary lens system 4, which, for example, is constructed as a reflector—in particular, as an ellipsoid-shaped half-spoon reflector. Instead of being constructed as a reflector, the primary lens system 4 can also be constructed as an auxiliary lens system from a light-conducting body made of transparent material with total-internal-reflecting properties. To prevent an overheating of the light source 3, it is either directly or indirectly fastened to a cooling body 5 via a carrier element or is thermally connected to the cooling body.

Further, the light module 1 includes a high-beam module 6 for production of a light distribution that lies largely above the "light/dark" boundary of the dimmed-light distribution. The high-beam module 6 also includes at least one light source 7, which is, in an embodiment, constructed as a semi-conductor light source—in particular, an LED. The light emitted from the light source 7 is bundled by a primary lens system 8, which, for example, is constructed as a reflector—in particular, as an ellipsoid-shaped half-spoon reflector. As an alternative, the primary lens system 8 can also be constructed as an auxiliary lens system. To prevent an overheating of the high-beam-light LED 7, it is likewise fastened to a cooling body 9 or is thermally connected to the cooling body.

A common projection-lens system 10 in the form of a projection lens is assigned to the passing-light sub-module 2 and the high-beam module 6. The projection-lens system 10 is used to reproduce light beams of the sub-modules 2, 6 in front of the motor vehicle and for production of a desired resulting overall light distribution of the light module 1. To clarify the shape of the projection lens 10, in FIG. 1, by way of example, a vertical section 11 through an optical axis of the projection lens is indicated. It can be clearly recognized that a light-exit surface 13 of the projection lens 10 is constructed convex-arched and a light-entry surface 14 of the projection lens 10 is constructed nearly plane (slightly convex).

Finally, the light module 1 includes a deflecting element 15 that deflects a light-beam course of at least one of the sub-modules 2, 6 (in the embodiment, deflecting the light beams of the high-beam module 6 before the light beams fall on the secondary lens system 10). In FIG. 1, the deflecting element 15 is constructed as a deflecting mirror, as shown in detail in FIGS. 5*a* through 5*d*.

The functional principle of the light module 1 is explained in greater detail below with the assistance of the beam courses of FIGS. 2*a* through 2*c*. Each of FIGS. 2*a* through 2*c* shows a meridian section through the light module 1 (from FIG. 1) along the optical axis 12 of the projection-lens system 10.

Figure 2A:
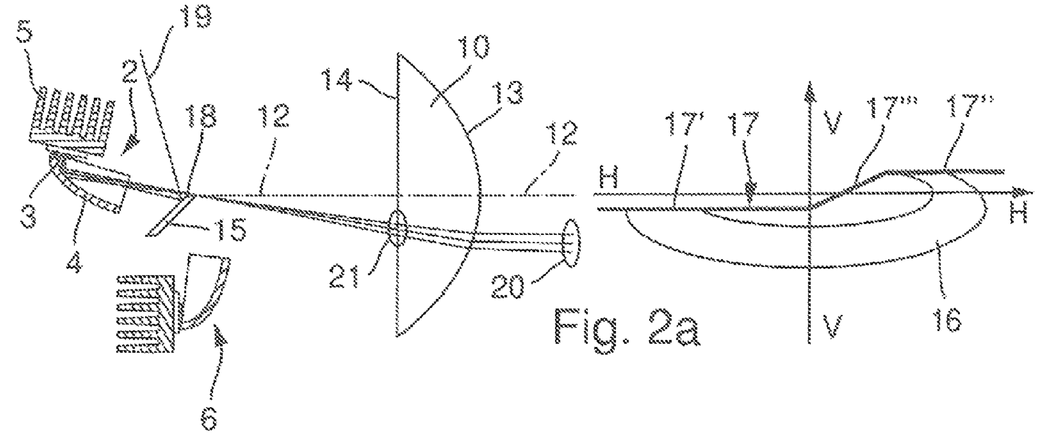
Figure 2B:
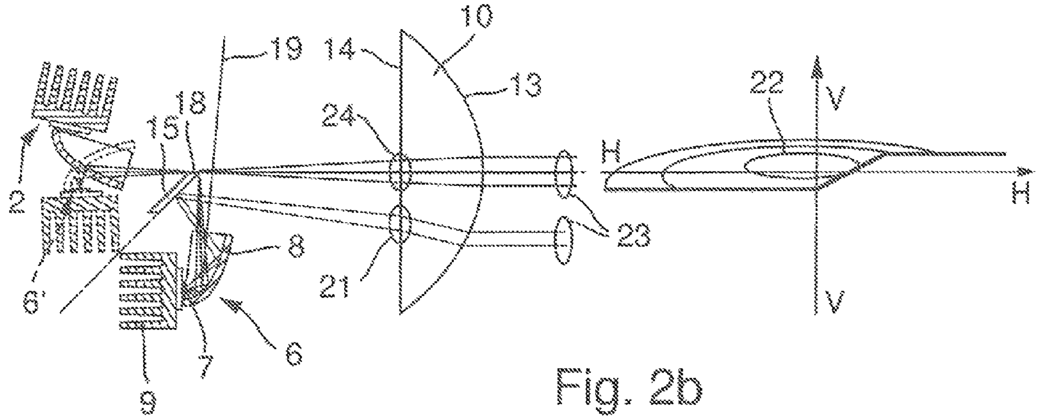
Figure 2C:
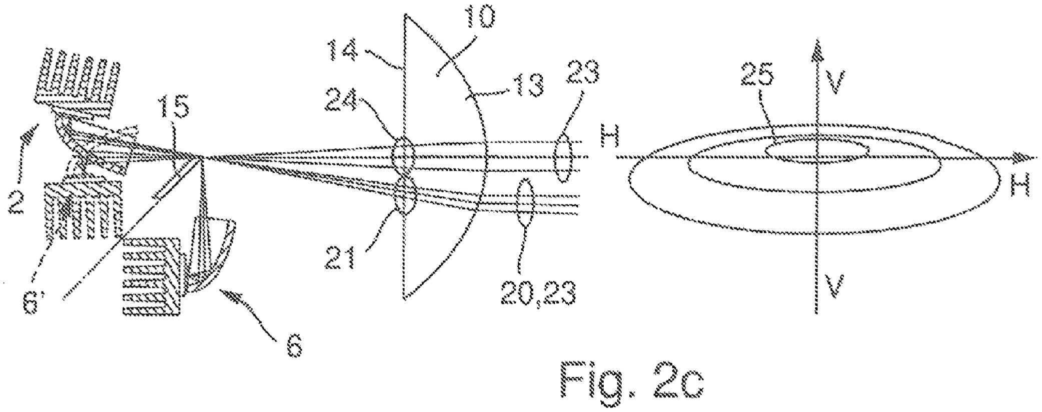

With the help of FIG. 2*a*, the production of a dimmed-light distribution 16 through the passing-light sub-module 2 is explained in greater detail. The dimmed-light distribution 16 is limited above by an essentially horizontal "light/dark" boundary 17. The "light/dark" boundary 17 exhibits in the embodiment a first horizontal segment 17' on the side of oncoming traffic and a second horizontal segment 17" on the side of traffic itself as well as an oblique-ascending (in an embodiment, at a 15° angle) connection segment 17'", which connects the two horizontal segments 17', 17" to one another. Such a "light/dark" boundary 17 is used, in particular, in Europe. Of course, the "light/dark" boundary 17 can also be constructed differently (e.g., in the form used in Japan and/or in the U.S.A.). In the case of the passing-light distribution 16, the most light lies below the "light/dark" boundary 17 (only for the achievement of legally prescribed "overhead lighting" values can a small portion of the light also be deflected in specified regions above the "light/dark" boundary 17).

The dimmed-light distribution 16 is reproduced in FIG. 2*a* on the right as it arises on a measuring screen arranged at a distance to the light module 1 in front of the motor vehicle. On the measuring screen, a horizontal "HH" and a vertical "VV" running perpendicular to it are indicated by way of example. The optical axis 12 of the projection-lens system 10 runs through the intersection point of the horizontal "HH" and of the vertical "VV". The horizontal segment 17' of the "light/ dark" boundary 17 on the side of oncoming traffic is arranged some angular degree below the horizontal "HH" and the horizontal segment 17" of the "light/dark" boundary on the traffic side itself is arranged some angular degree above the horizontal "HH."

The light produced by the passing-light sub-module 2 is emitted largely in the direction of an upper edge 18 of the deflecting element 15. The contour of the upper edge 18 of the deflecting element 15, which simultaneously fulfills the function of a diaphragm arrangement, corresponds to the desired course of the "light/dark" boundary 17. The upper edge 18 is reproduced through the projection lens 10 as a "light/dark" boundary 17 on the measuring screen or lane in front of the motor vehicle. The upper edge 18 of the deflecting element 15 is located in a focal point or a local plane of the projection-lens system 10. In an embodiment, both the surface of the deflecting element 15 facing the passing-light sub-module 2 as well as the surface of the deflecting element 15 facing the high-beam module 6 are mirrored-constructed. In addition, in an embodiment, the upper edge 18 of the deflecting element 15 is also mirrored. A relatively small portion of the light beams emitted from the passing-light sub-module 2 does not pass the deflecting element 15, but, rather, falls on a reflecting surface of the deflecting element 15 and is reflected in such a way that the light beam does not fall on the projection-lens system 10. Such a light beam is indicated in FIG. 1, by way of example, at 19. The passing-light beams 20 going past the deflecting element 15 fall on the secondary lens system 10 in a segment below the optical axis 12. The majority of the passing-light beams, however, do not fall on the deflecting element 15 and are not deflected. Only the light beams passing by the deflecting element 15 are used for the production of light distributions 16 or 25. This segment is indicated at 21. If the deflecting element 15 is constructed to be light-absorbing, the smaller portion of the light beams, which falls on the deflecting element 15, is absorbed. The mirroring of the deflecting element 15 is, thus, solely optional.

In FIG. 2*b*, the production of a light distribution 22, which lies largely above the "light/dark" boundary 17 of the dimmed-light distribution 16, is explained in greater detail through the high-beam module 6. The light distribution 22 is also referred to as "complementary high-beam light distribution" or "high-beam spot" since, together with the dimmed-light distribution 16, it supplements or overlays to a full-value high-beam light distribution (as it is present, for example, in FIG. 2*c* on the right and is indicated at 25). The light distribution 22 exhibits an essentially greater brightness than the passing-light distribution 16. Thus, in the region of the "light/dark" boundary 17, a great brightness gradient can form in the overall light distribution 25, which is often perceived as being disruptive. In the case of the embodiment from FIG. 2*b*, the light source 3 of the passing-light sub-module 2 is deactivated. Only the light source 7 of the high-beam module 6 is switched "on" and emitting light. The light emitted from the high-beam module 6 falls largely near the upper edge 18 on a mirrored surface of the deflecting element 15 facing the high-beam module 6. The beam paths of the high-beam light beams emitted from the high-beam module 6 are deviated on the focal plane of the projection lens 10 so that both beam paths 20, 23 can essentially be reproduced by/through the same lens surface or the same segment 21 of the projection-lens system 10.

A virtual mirror image of the high-beam module 6 is indicated in dashed lines in FIG. 2*b* at 6'. Thus, through the deflecting element 15, the impression can be created that the passing-light sub-module 2 and the high-beam module 6 (in the form of the virtual mirror image 6') or the reflecting-surface segments of the reflector 4 and of the virtual image of the reflector 8 of the virtual mirror image 6' of the high-beam module 6 are arranged practically congruently in the same position in the light module 1. In this way, the light-exit surface of the projection-lens system 10 vis-à-vis the light module 1 can be significantly reduced without the deflecting-lens system. In particular, the projection lens 10 can be constructed about half as large as without the deflecting element 15.

The light emitted from the high-beam module 6, which falls near the upper edge 18 of the deflecting element 15 on the mirroring surface, is reflected from the mirroring surface in a segment 24 of the projection lens 10. In the process, it is a matter of the smaller portion of the light beams of the high-beam module 6. The majority of the light beams emitted from the high-beam module 6 are likewise deflected via the mirroring surface of the deflecting element 15 to the same segment 21 of the projection lens 10 upon which the majority of the passing-light beams 20 have already fallen. Just enough light is deflected in the segment 24 of the projection lens 10 as is necessary for the correction of the resulting overall light distribution 25 in the region of the "light/dark" boundary 17. The remaining majority of the high-beam light beams 23 are deflected in the direction of the same segment 21 of the projection lens 10 upon which also the majority of the passing-light beams 20 fall. Hence, essentially the same segments 21 of the projection lens 10 are resorted to for production of the overall light distribution 25 both for the passing-light beams 20 and also for the high-beam light beams 23. As a result, it is possible to implement the projection lens 10 especially compact—in particular, with an especially small diameter. Simultaneously, the smaller portion of the light beams 23 of the high-beam module 6, which is used for correction of the overall light distribution 25 in the region of the "light/dark" boundary 17, is guided through another segment 24 deviating from the first segment 21 through the projection lens 10. In this other segment 24, optimizing measures can then be provided to randomly deflect the small portion of the high-beam light beams 23 for the correction of the overall light distribution 25 in the region of the "light/dark" boundary 17 without impairing the production of the overall light distribution 25.

In FIG. 2*c*, a light-beam course is shown, by way of example, when both the passing-light sub-module 2 and also the high-beam module 6 are switched "on." In the process, the passing-light beams 20 and the high-beam light beams, which pass through the common segment 21 of the projection-lens system 10, overlay to the resulting overall light distribution 25 in the form of a complete overall high-beam light distribution 25. In the case of the high-beam light distribution 25, light reaches both below and above the passing light "light/dark" boundary 17. The light 16 below the "light/dark" boundary 17 originates largely from the passing-light sub-module 2, and the light 22 above the "light/dark" boundary 17 originates largely from the high-beam module 6.

The light beams 23 of the high-beam module 6 passing through the other segment 24 of the projection lens 10 are used for correction of the overall light distribution 25 in the region of the "light/dark" boundary 17 of the dimmed-light distribution 16. To this end, a suitable deflector can be provided in, on, or at the projection-lens system 10, the deflector deflecting at least one part of the light beams 23 falling on the other segment 24 of the projection-lens system 10 downward. The type and design of the deflector are explained in greater detail below with the help of FIGS. 4*a* through 4*c*.

Figure 3A:
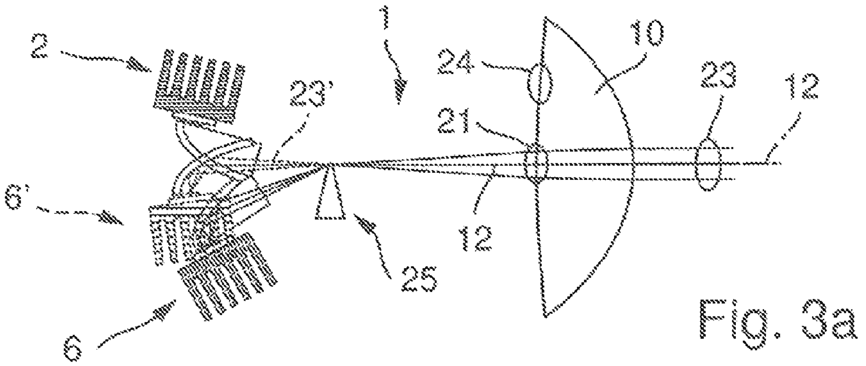

FIGS. 3*a* through 3*d* show different embodiments for the deflecting element 15. In FIG. 3*a*, the deflecting element 15 is constructed as a prism 25 with triangular cross-sectional Area. A longitudinal axis of the prism 25 extends essentially perpendicular to the optical axis 12 of the projection-lens system 10. The deflecting prism 25 serves to deflect the high-beam light beams 23 so that a majority of the light beams 23 of the high-beam module 6 falls on the same segment 21 of the projection-lens system 10 as the majority of the passing-light beams 20. The virtual image of the high-beam module 6 is indicated at 6' and is arranged approximately symmetrical to the passing-light sub-module 2. The light beams 20 of the passing-light sub-module 2 and the virtual light beams 23' of the virtual image 6' of the high-beam module 6 apparently originate from the same place of the light module 1. In the embodiment shown in FIG. 3*a*, the common segment 21 is constructed as a central segment of the projection-lens system 10, the segment extending around the optical axis 12. One possible design of the deflecting prism 25 is described in further detail below with reference to FIGS. 7*a* through 7*c*.

Figure 3B:
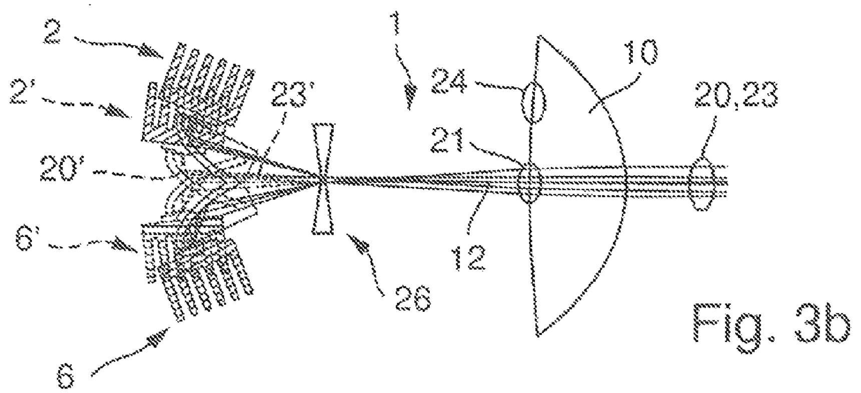

In the case of the embodiment of FIG. 3*b*, the deflecting element 15 is constructed as a double prism 26, which deflects both beam paths 20, 23 of both the passing-light sub-module 2 and the high-beam module 6 so that they fall on the same segment 21 of the projection-lens system 10. The corresponding virtual images of sub-modules 2, 6 are indicated at 2', 6' and are arranged symmetrically to one another. The virtual light beams 20' of the virtual image 2' of the passing-light sub-module 2 apparently originate from the same place of the light module 1. The design of the double prism 26 is explained in greater detail below with reference to FIGS. 8*a* through 8*c*.

Figure 3C:
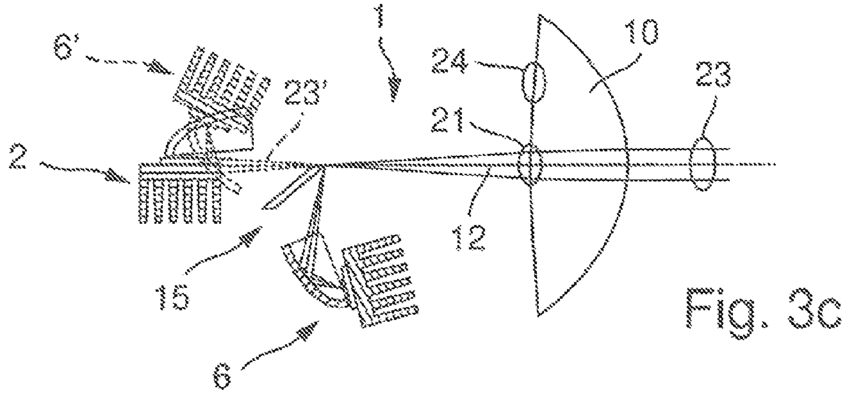

The embodiment of FIG. 3*c* corresponds essentially to the embodiment of FIGS. 2*a* through 2*c*. In the process, the deflecting element 15 is constructed as a deflecting mirror that deflects the high-beam-light-beam path 23 of the high-beam module 6 so that the high-beam-light-beam path falls on the same segment 21 of the projection-lens system 10 as a majority of the light beams 20 of the passing-light sub-module 2. The virtual image of the high-beam module 6 is indicated at 6' and is arranged approximately symmetrically to the passing-light sub-module 2. The light beams 20 and the virtual light beams 23' of the virtual image 6' of the high-beam module 6 apparently originate from the same place of the light module 1. The design of the deflecting mirror 15 is explained in greater detail further below with reference to FIGS. 5*a* through 5*d*.

Figure 3D:
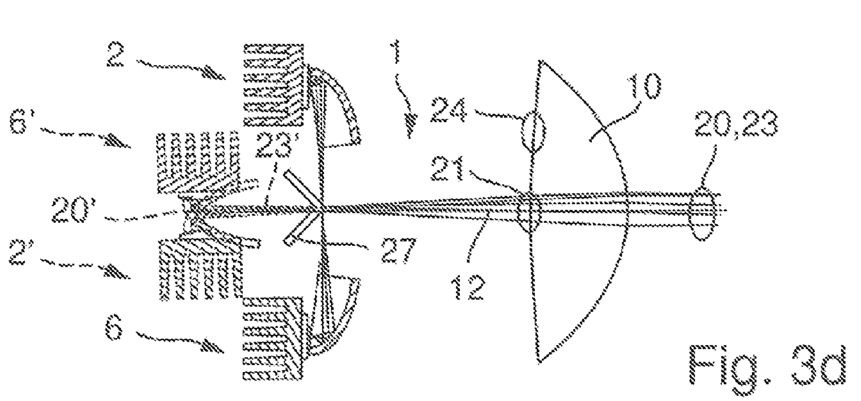

In the case of the embodiment from FIG. 3*d*, the deflecting element 15 is constructed as a so-called "roof-edged mirror 27," which deflects both beam paths 20, 23 of the passing-light sub-module 2 and of the high-beam module 6 so that they both fall on the same segment 21 of the projection-lens system 10. The corresponding virtual images of sub-modules 2, 6 are indicated at 2', 6' and are arranged symmetrically to one another. The virtual light beams 20' of virtual image 2' of the passing-light sub-module 2 and the virtual light beams 23' of the virtual image 6' of high-beam module 6 apparently originate from the same place of the light module 1. The concrete design of the roof-edged mirror 27 is explained in greater detail further below with reference to FIGS. 6*a* through 6*d*.

In the case of the embodiments of FIGS. 3*a* and 3*c*, the passing-light beams 20 are not deflected by corresponding deflecting element 25 or 15, but, in spite of this, fall on the same segment 21 of the projection-lens system 10. Further, in the case of all the embodiments of FIGS. 3*a* through 3*d*, a small portion of the light beams 23 of the high-beam module 6 does not fall on the common segment 21 of the projection-lens system 10, but, rather, falls on a different segment of the projection-lens system 10—for example, the other segment 24 (although the corresponding beam paths in FIGS. 3*a* through 3*d* are not indicated). The small portion of the high-beam light beams 23, which falls on the other segment 24, is used for correction of the overall light distribution 25 of the light module 1—in particular, in the region of the "light/dark" boundary 17 of the passing-light distribution 16—by deflecting at least a portion of the light beams 23 falling on the other segment 24 of the projection-lens system 10 deflected downward by suitable deflecting elements. As a result of this, for example, a shadow, a color fringe, or a high brightness gradient in the region of the "light/dark" boundary 17 can be reduced or even eliminated.

Figure 4A:
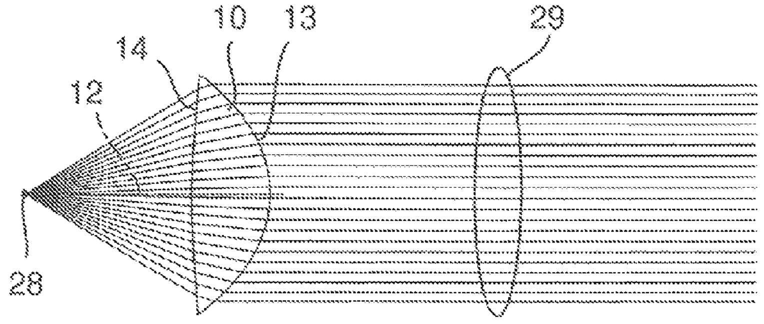

With the assistance of FIGS. 4*a* through 4*c*, embodiments of the deflector for lowering the light beams 23 passing through the other segment 24 of the projection-lens system 10 are explained in greater detail further below. For clarification, FIG. 4*a* shows a projection lens 10 with an ideal (dot-shaped) light source 28 arranged in the focal point of the lens 10. In the process, the projection lens 10 is, in an embodiment, designed in such a way that the light beams emitted from, the light source 28 are deflected for the formation of a bundle of parallel light beams 29.

Figure 4B:
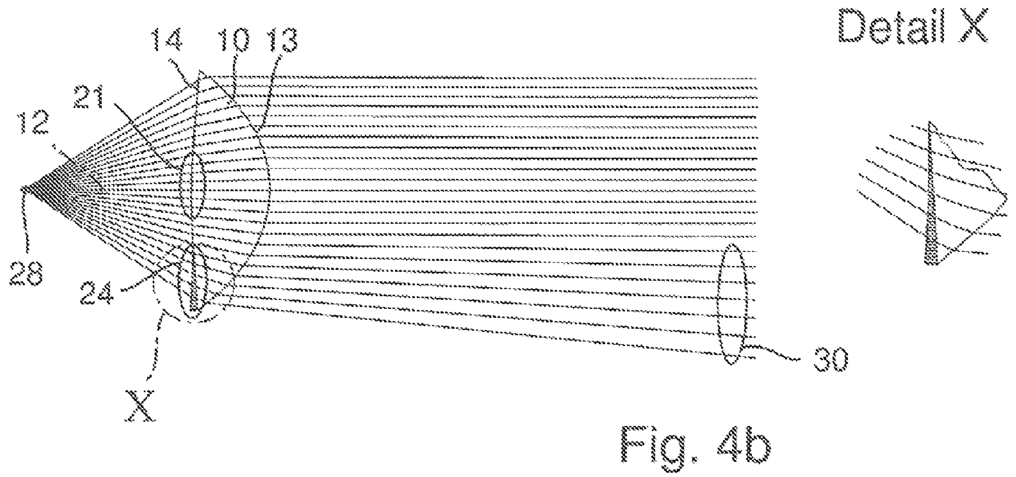

In the case of the embodiment from FIG. 4*b*, the other segment 24 of the secondary lens system 10 is arranged at a lower peripheral region of the projection lens 10. In this segment 24, the light-entry surface 14 of the projection lens 10 and/or the light-exit surface 13 is/are designed in such a way that the refractive power of the lens 10 is reduced. As a result, the light beams falling on the segment 24 are deflected less severely upward in comparison to FIG. 4*a*. Below the line, a downward deflection of the light beams passing through the projection lens 10 takes place. The lowered partial light bundle is indicated at 30 in FIG. 4*b*. For reduction of the refractive power of the projection lens 10, in particular, the light-entry surface 14 of the lens 10 is varied in such a way that the light beams emitted from the light source 28 fall more steeply (that is, with a smaller angle) on the entry surface 14. To this end, the light-entry surface 14 of the lens 10 can be deformed to the lower edge in the direction of the light source 28 (compare FIG. 4*b* right). In corresponding manner, in addition or as an alternative, the light-exit surface 13 of the lens 10 can be deformed. In the process, the focal distance in the lower lens zones is greater. The focal points lie then, in an embodiment, between the primary lens system 8 and the deflecting element 15.

Figure 4C:
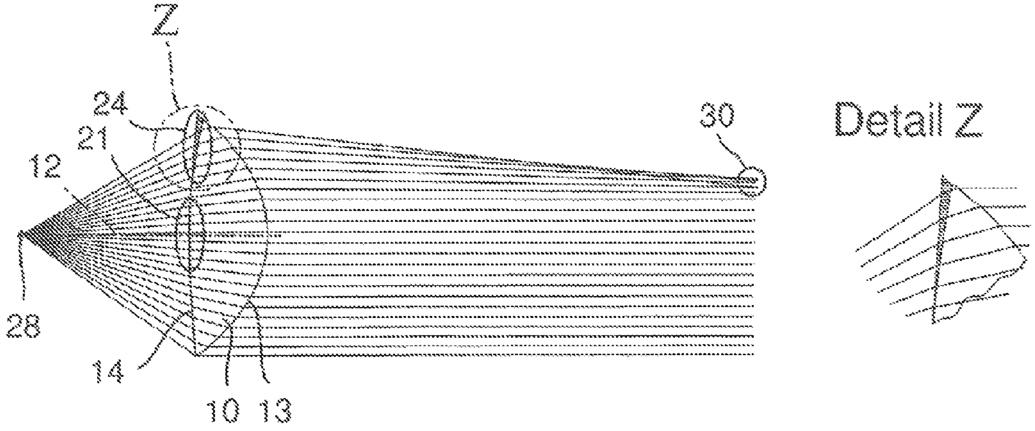

In the case of the embodiment from FIG. 4*c*, the other segment 24 of the projection lens 10 is arranged above the optical axis 12—in an embodiment, at an upper peripheral region of the lens 10. To deflect the light beams 29 passing through the segment 24 downward, the refractive power of the projection lens 10 must be increased in this upper peripheral region. This can be achieved by variation of the course of the light-entry surface 14 and/or the course of the light-exit surface 13 of the projection lens 10. In particular, the light-entry surface 14 and/or the light-exit surface 13 can be varied such that the light beams emitted from, the light source 28 fall flatter (thus, at a greater angle) on the light-entry surface 14 or the exit surface 13 (compare FIG. 4*c* right). The lowered partial light bundle is also indicated at 30 in FIG. 4*c*. In the process, the focal distance in the upper lens zones is greater. The focal points lie, in an embodiment, between the deflecting element 15 and the projection-lens system 10.

The lowered partial light bundle 30 of the embodiments from FIGS. 4*b* and 4*c* are, in an embodiment, deflected so far downward that they at least partially overlay the "light/dark" boundary 17 of the passing-light distribution 16. In this way, shortcomings (shadows, color fringes, great brightness gradients, etc.) of the overall light distribution 25 in the region of the "light/dark" boundary 17 can be reduced or even compensated.

Figure 5B:
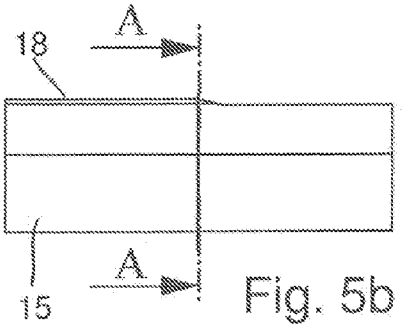
Figure 5D:
Figure 5A:
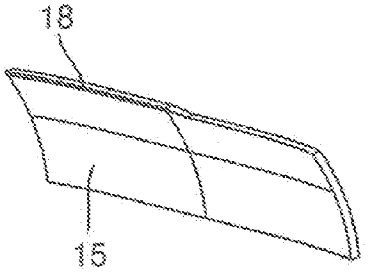
Figure 5C:
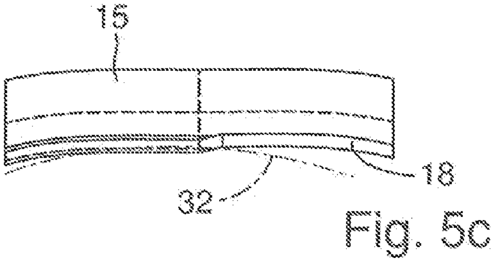
Figure 6B:
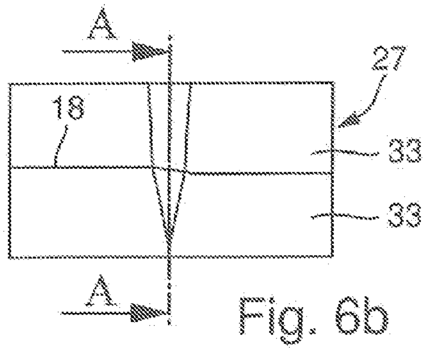
Figure 6D:
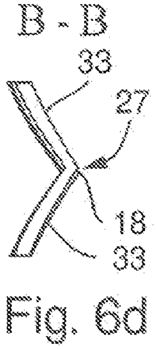
Figure 6A:
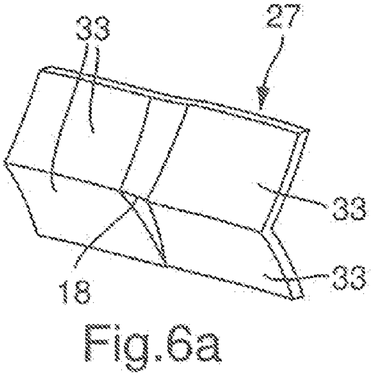
Figure 6C:
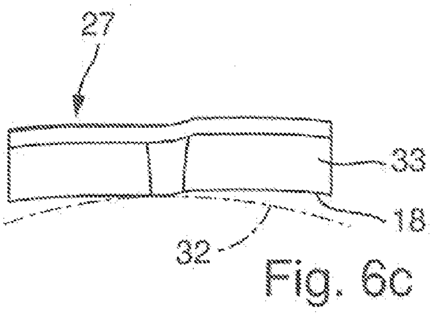

FIGS. 5*a* through 5*d* show in detail a deflecting element constructed as a deflecting mirror 15. FIG. 5*a* shows a perspective view, FIG. 5*b* shows a top view parallel to the optical axis 12 and toward a light-exit direction 31 (compare FIG. 1), FIG. 5*c* shows a top view of the deflecting mirror 15 from above perpendicular to the optical axis 12, and FIG. 5*d* shows a sectional view "A-A" of the deflecting mirror 15 (likewise perpendicular to the optical axis 12). An upper edge 18 of the deflecting mirror 15 is contoured corresponding to the desired course of the "light/dark" boundary 17 and can be adapted or approximated to the form of a "Petzval" surface 32 (compare FIG. 5*c*) of the projection-lens system 10. The surface of the deflecting mirror 15 directed to the high-beam sub-module 6 is constructed as a mirror surface. The mirror surface can be arched—in particular, concave-arched (as shown, for example, in FIGS. 5*a* and 5*d*). The upper edge 18 of the deflecting mirror 15 is, in an embodiment, arranged in a focal point or in a focal plane of the projection-lens system 10.

FIGS. 6*a* through 6*d* show in detail the roof-edged mirror 27 of the embodiment from FIG. 3*d*. Broadly speaking, the roof-edged mirror 27 consists of two deflecting mirrors put together in the region of their upper edges 18. In the process, one of the two deflecting mirrors corresponds approximately to the deflecting mirror 15 from FIGS. 5*a* through 5*d*. The other of the two deflecting mirrors arises through a mirroring of the first deflecting mirror to a horizontal mirror-plane including the optical axis 12. In the cross-section (compare FIG. 6*d*), the roof-edged mirror 27 has the shape of an arrow or, after being turned about 90°, the shape of a roof. The contour 18 of the "light/dark" boundary 17 runs essentially on a horizontal plane including the optical axis 12 and exhibits a contour course corresponding to the course of the desired "light/dark" boundary 17. The contour 18 of the "light/dark" boundary 17 is, in an embodiment, arranged in the focal point or the focal plane of the projection lens 10. Through the two mirrored surfaces 33 of the roof-edged mirror 27 directed to the passing-light sub-module 2 or the high-beam module 6, the light beams of the passing-light sub-module 2 or of the high-beam sub-module 6 are deflected in the direction of the projection leas 10. The roof-edged mirror 27, thus, serves the purpose of deflecting the two beam paths of both sub-modules 2, 6. The contour 18 of the "light/dark" boundary 17 can be adapted to the course of a "Petzval" surface 32 of the projection lens 10 (compare FIG. 6*c*). In addition, the mirror surfaces 33 can be constructed arched—in particular, concave-arched (compare FIGS. 6*a* and 6*d*).

Figure 7A:
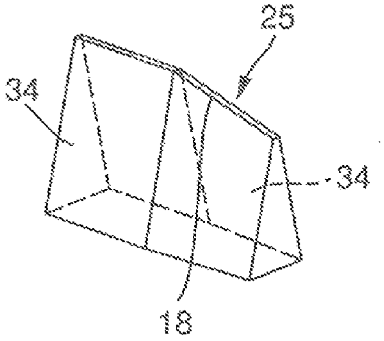
Figure 7B:
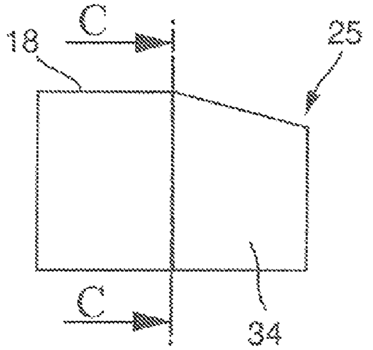
Figure 7C:
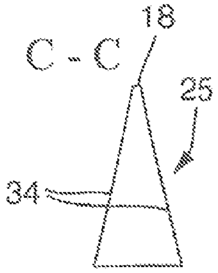

FIGS. 7*a* through 7*c* show in detail a deflecting element of the embodiment from FIG. 3*a* constructed as a prism 25. FIG. 7*a* shows a perspective view of the prism 25, FIG. 7*b* shows a top view of the prism 25 toward the light-exit direction 31, and FIG. 7*c* shows a sectional view through the prism 25 on sectional plane "C-C." The prism 25 also exhibits an upper edge 18 with a contour that corresponds to the course of the desired "light/dark" boundary 17. This edge 18 is, in an embodiment, arranged in the focal point or on the focal plane of the projection-lens system 10. In addition, proceeding from the upper edge 18, the prism 25 includes two oblique-running prism surfaces 34 that are constructed straight or plane in the embodiment. Of course, the prism surfaces 34 can also be constructed arched.

Figure 8A:
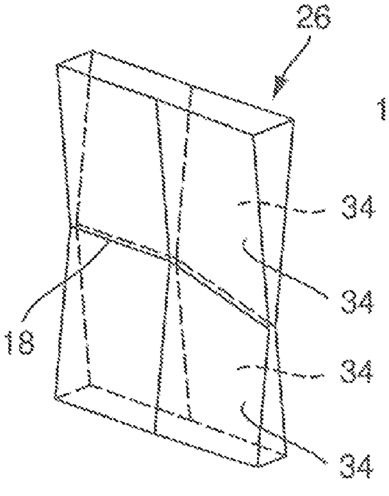
Figure 8B:
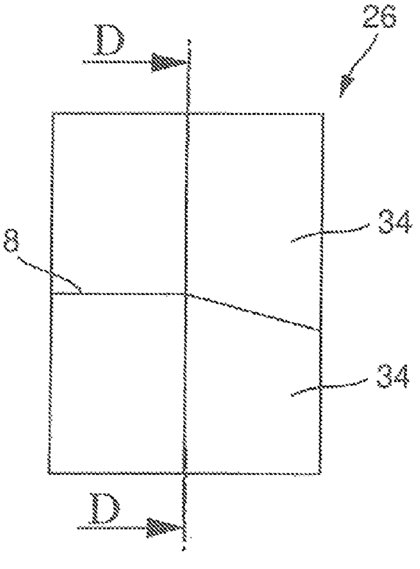
Figure 8C:
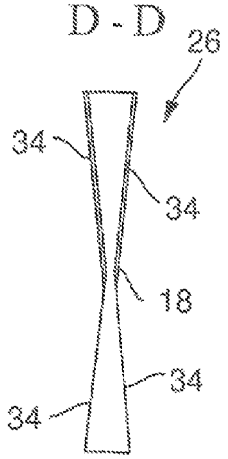

Finally, in FIGS. 8*a* through 8*c*, a double prism 26 of the embodiment from FIG. 3*b* is presented in detail. FIG. 8*a* shows a perspective view of the double prism 20, FIG. 8*b* shows a top view toward the light-exit direction 31, and FIG. 8*c* shows a sectional view on a sectional plane "D-D." The contour 18 of the "light/dark" boundary 17 is constructed at the thinnest place of the double prism 26. The contour 18 is in an embodiment, arranged in a focal point or a focal plane of the projection plane 10. The prism surfaces 34 are presented straight or plane in FIGS. 8*a* through 8*c*. Of course, they can also be constructed arched.

Since a prism 25 and a double prism 26 can only cause a relatively weak deflection of the light beams 20, 23 passing through them, in the embodiment of FIGS. 3*a* and 3*b*, the direction of the light beams 20, 23 or the desired light distribution should be performed to a great extent. For this reason, for example, in the embodiment of FIG. 3*b*, the passing-light sub-module 2 and the high-beam module 6 also lie relatively close together since, otherwise, the light-beam bundles 20, 23 cannot be deflected so far through the double prism 26 that they pass through the same segment 21 of the projection-lens system 10.

Figure 9A:
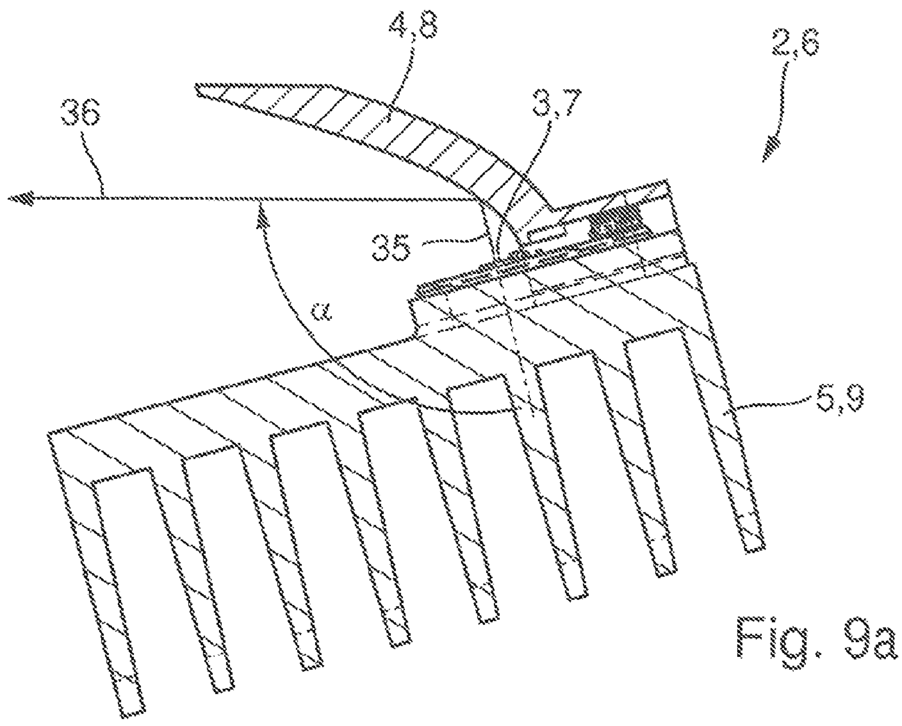
Figure 9B:
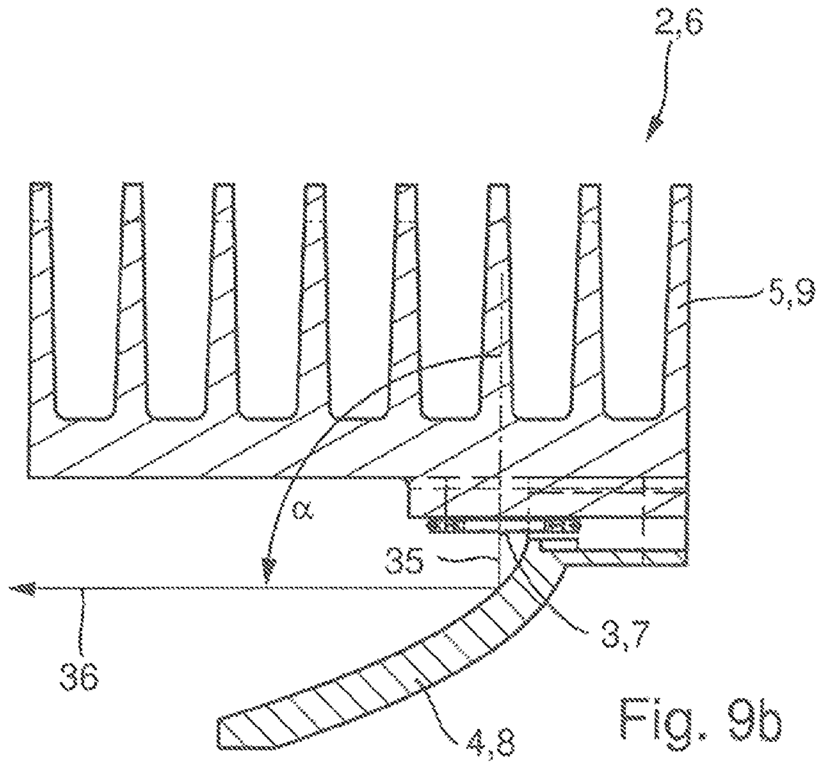

With the assistance of FIGS. 9*a* and 9*b*, an explanation is given as to which effects an angle "α" has between a main direction of emission 35 of the light source 3, 7 and a main direction of emission 36 of the sub-module 2, 6. In the embodiment of FIG. 9*a*, the angle "α" is a fairly flat angle and, for example, is −105°. In the case of the embodiment of FIG. 9*b*, the angle "α" is constructed more acute and is, for example, +90°. More obtuse angles (compare FIG. 9*a*) cause more variably large light-source images. As a result of this, a relatively small "optical efficiency" factor arises in the event of a greater dynamic of the light distribution (i.e., a great range). More acute angles "α", on the other band, supply more equally large light-source images. That means similar brightness differences, for example, for a spotlight distribution. Depending on the desired type of resulting light distribution, the sub-modules 2, 6 can be correspondingly designed and aligned within the light module 1.

Acute angles "α," thus, supply approximately equally large light-source images, which is good for spotlight distributions. Obtuse angles "α," on the other hand, cause great differences in the size of the light-source images.

In the case of the light module 1, in advantageous manner, the high-beam module 6 and the deflecting element 15, 25, 26, 27 are arranged aligned to one another such that the virtual high-beam sub-module 6' is arranged symmetrically to the passing-light sub-module 2 with respect to a horizontal plane that includes the optical axis 12 of the projection-lens system 10. Through the arrangement of the individual parts of the light module 1 in the proposed manner, parts of the high-beam course 23 can be separated in the projection lens 10 so that they fall on different segments 21, 24 of the projection-lens system 10. A majority of the high beams 23 fall on the same segment 21 of the projection-lens system 10 upon which a majority of the passing-light beams 20 also fall. A smaller portion of the high beams 23 falls on a different segment 24 of the projection-lens system 10 so that this smaller portion of the high beams 23 can be deflected downward through suitable measures or deflection—in an embodiment, in the region of the "light/dark" boundary 17 of the passing-light distribution 16 (compare FIG. 12). As a result, it is possible, on the one hand, to design the projection-lens system 10 especially small using the example of a projection lens 10 with an especially small diameter and, on the other hand, to reduce or even compensate disturbing non-homogeneities of the overall light distribution 25 in the region of the "light/dark" boundary 17.

Simultaneously, the beam paths 20, 23 of the different sub-modules 2, 6 are separated in such a way that, in the case of passing light (with deactivated high-beam sub-module 6)

(except for the light for production of the mandatory overhead values), no light is scattered beyond the “light/dark” boundary 17 so that a blinding of other traffic participants can be prevented. Simultaneously, in the case of high beam (passing-light sub-module 2 and high-beam sub-module 6 activated), no dark or colored lines remain in the region, of the “light/dark” boundary 17. Due to the fact that a small portion of the high-beam path 23 beyond the “light/dark” boundary 17 is lowered into the passing-light distribution 16, the transition between the high-beam partial distribution 22 and the passing-light distribution 16 is blurred without impairing the acuity (the illumination gradients) of the passing-light, “light/dark” boundary 17 in passing-light mode of the light module 1. Another advantage of the light module 1 consists in the fact that it is possible to switch between passing light and high beam without requiring mechanical adjustment elements.

In summary, the invention relates to a combined multiple-function LED projection system 1 for the production of at least one dimmed-light distribution 16 with a predominantly horizontal “light/dark” boundary 17 and at least one high-beam light distribution 25 without a “light/dark” boundary. The high beam 25 is formed as an overall light distribution from a passing-light-beam path 20 (passing-light distribution 16) and high-beam path 23 (partial high-beam light distribution 22) of the system 1. The projection system 1 has, toward this purpose, at least one passing-light sub-module 2 including at least one independently switchable LED light source 3 with at least one collecting primary lens system 4 for the passing-light-beam path 20 and at least one high-beam sub-module 6 likewise including at least one independently switchable LED light source 7 with at least one collecting primary lens system 8 for the high-beam path 23. With the assistance of the primary lens systems 4, 8 assigned to them, each of the light sources 3, 7 produces different interim light distributions on the focal plane of the downstream projection-lens system 10. The projection-lens system 10 then throws the image of these interim light distributions as passing light 16 or high beam 25 onto the lane. The primary lens systems 4, 8 are, in an embodiment, constructed as ellipsoid-shaped half-spoon reflectors.

In particular, the high-beam sub-module 6 includes a primary lens system 8 that splits the high-beam path 23 such that a main beam path deflected at the deflecting-lens system 15, 25, 26, 27 in the common segment 21 falls on the projection-lens system 10 while an auxiliary beam path at the common segment 21 falls past on the other segment 24 of the projection-lens system 10. The passing-light-beam path 20 shines largely past the deflecting-lens system 15, 25 and falls in the common segment 21 on the projection-lens system 10. Light beams 19 of the passing-light-beam path 20, which fall on the deflecting-lens system 15, 25, are absorbed there or deflected through the deflecting-lens system on the projection-lens system 10. Both beam paths 20, 23 are, in an embodiment, arranged such that they run through the projection-lens system 10 largely mirror-symmetrically to the plane through the vertical “VV” and the optical axis 12 of the lens system 10. The sub-modules 2, 6 (or, in the case of deflected beam paths 20, 23, their virtual images 2' or 6') are arranged approximately mirror-symmetrically to the optical axis 12 of the projection-lens system 10. Since the ellipsoid mirrors 4, 8 deflect the beam path of the light sources 3, 7 by about 90°, the LED light sources 3, 7 of the two light modules 2, 6—or, in the case of deflected beam paths 20, 23, the virtual images of the light sources—radiate in approximately opposed directions, but span at least an angle of more than 90° (compare FIGS. 2, 3 and 9).

It is conceivable that the beam paths 20, 23 of both the passing light and the high-beam light are deflected by the deflecting-lens systems 26, 27 (as shown, for example, in FIGS. 3*b* and 3*d*). This can be achieved through deflecting-lens systems 26, 27 in accordance with FIGS. 6*a* through 6*d* and FIGS. 8*a* through 8*c*.

As explained in greater detail with the assistance of FIGS. 4*a* through 4*c*, a peripheral region 24 of the projection-lens system 10 can be constructed such that it does not have any dimming properties. In this region, the images of the light sources 3, 7 are lowered in a vertical direction in comparison to the light-source images from the main regions 21 of the projection-lens system 10. Thus, an overlap between the passing-light-beam path 20 and the high-beam path 23 is achieved. As shown in FIG. 4*c*, in particular, the upper edge 24 of a projection-lens system 10 constructed as a projection lens can be continuously lowered vis-à-vis the main lens zone 21 by continuously enlarging the prism angle of the projection lens 10 in meridian section from the lens center to the upper lens edge (i.e., the refractive power in the vertical sections of the lens 10 is enlarged to the upper lens edge). Further, as shown in FIG. 4*b*, the lower edge 24 of a protection lens 10 can be continuously lowered vis-à-vis the main lens zone 21 by continuously reducing the prism angles of the projection lens 10 in the meridian section from the lens center to the lower lens edge (i.e., the refractive power in the vertical sections of the lens 10 to the lower lens edge is reduced).

The projection-lens system 10 of the multiple-function LED projection-lens system 1 can be constructed as a convergent lens (projection lens) or as a concave mirror—in particular, as a parabolic mirror. Images of the light sources 3, 7 can also be reproduced through a concave mirror for the production of desired resulting light distribution 16 or 25 in front of the motor vehicle on the lane (compare FIG. 10).

The deflecting-lens system 15 can, as shown in FIGS. 5*a* through 5*d* and in FIGS. 6*a* through 6*d*, be constructed as a mirror 15, 27. A mirror edge 18 runs, in an embodiment, along the “Petzval” surface 32 of the projection-lens system 10 and exhibits a contour corresponding to the desired course of the passing-light, “light/dark” boundary 17. The deflecting mirrors 15, 27 can exhibit an arched shape in a vertical section (compare FIGS. 5*d* and 6*d*)—in particular, a concave-arched shape.

Further, the deflecting-lens system 15, as shown in FIGS. 7*a* through 7*c* and in FIGS. 8*a* through 8*c*, can also be constructed as a prism 25, 26. A prism edge 18 runs approximately along the “Petzval” surface of the projection-lens system 10 and exhibits a contour corresponding to the desired course of the passing-light, “light/dark” boundary 17. It is conceivable that the deflecting prism 25, 26 exhibits arched prism surfaces 34 in a vertical section (compare FIGS. 7*c* and 8*c*)—in particular, convex-arched prism surfaces 34. The deflecting prism 25, 26 can be made of a transparent material—in particular, glass or plastic. In a region corresponding to the passing-light, “light/dark” boundary 17, the transparent prism body exhibits the lowest wall thickness and becomes thicker downward (in the event of a double prism 26 becoming thicker downward and upward).

The primary lens systems 4, 8 of the sub-module 2, 6, which produces the deflected beam path 20, 23 (in an embodiment, the primary lens system 8 of the high-beam module 6), can be constructed in one piece together with the deflecting-lens system 15, 25, 26, 27. The combined primary/deflecting-lens system then consists, in an embodiment, of a totally reflecting glass or plastic body, wherein both the bundling of the light beams emitted from the light source 3, 7 as well as the deflecting of the beam path takes place by refraction to light-entry and light-exit surfaces and/or by total reflection at boundary surfaces of the transparent body. The combined primary/deflecting-lens system is pivoted around a horizontal axis, wherein the axis of rotation approximately coincides with an outer edge of the associated light source 3, 7 (an LED chip). By turning the combined primary/deflecting-lens system, the aperture edge can be moved along the optical axis 12, wherein the focal points of the primary lens system 10 (e.g., an ellipsoid mirror) continue to be focused on aperture edges 18 and light source(s) 3, 7. In this way, the passing-light color fringe can be adjusted.

The primary lens systems 4, 8 of the light modules 2, 6 are, in an embodiment, ellipsoid-shaped half-spoon reflectors, wherein at least the vertical meridian section of the reflectors 4, 8 exhibits a largely elliptical contour of the section. In the process, the first focal point of the ellipsoid-shaped, half-spoon reflector 4, 8 focuses on an outer edge of the associated light source 3, 7 (i.e., on the edge of the LED chip or LED array). The second focal point of the ellipsoid 4, 8 lies on the focal plane of the projection-lens system 10 on the edge 18 of the deflecting-lens system 15 where the beam path 20, 23 of the passing light and/or high beam is divided and is reproduced on the lane through the projection-lens system 10 as a "light/dark" boundary 17 (compare FIGS. 2, 3 and 9).

The components of the light module 1 shown in FIG. 1 are fastened to one another via at least one retaining element so that the entire light module 1 forms a separately manageable unit. The retaining element with the components fastened to it can be mechanically fastened with three fastening points in a housing of a lighting device—in particular, of a headlight. The fastening points are, in an embodiment, designed as spherical or toric bearings. In an embodiment, the retaining element is designed in multiple parts, wherein, in particular, the fastening/bearing points are designed with separate components (e.g., ball joints, ball cups, etc.). The triangle stretched through the bearing points is approximately rectangular and has an approximately horizontal side and an approximately vertical side. This facilitates a largely independent adjustment of the retaining element with the components of the light module 1 fastened to it around a horizontal axis (for realization of headlight-range control) and a vertical axis (for realization of a dynamic "bending light" function). The retaining element is, in an embodiment, detachable connected to the components of the light module 1 shown in FIG. 1 (e.g., by screws, transom connections, clip connections, or bayonet joints). As a result, the components or the light module 1 can be replaced non-destructively in case of service.

Figure 10:
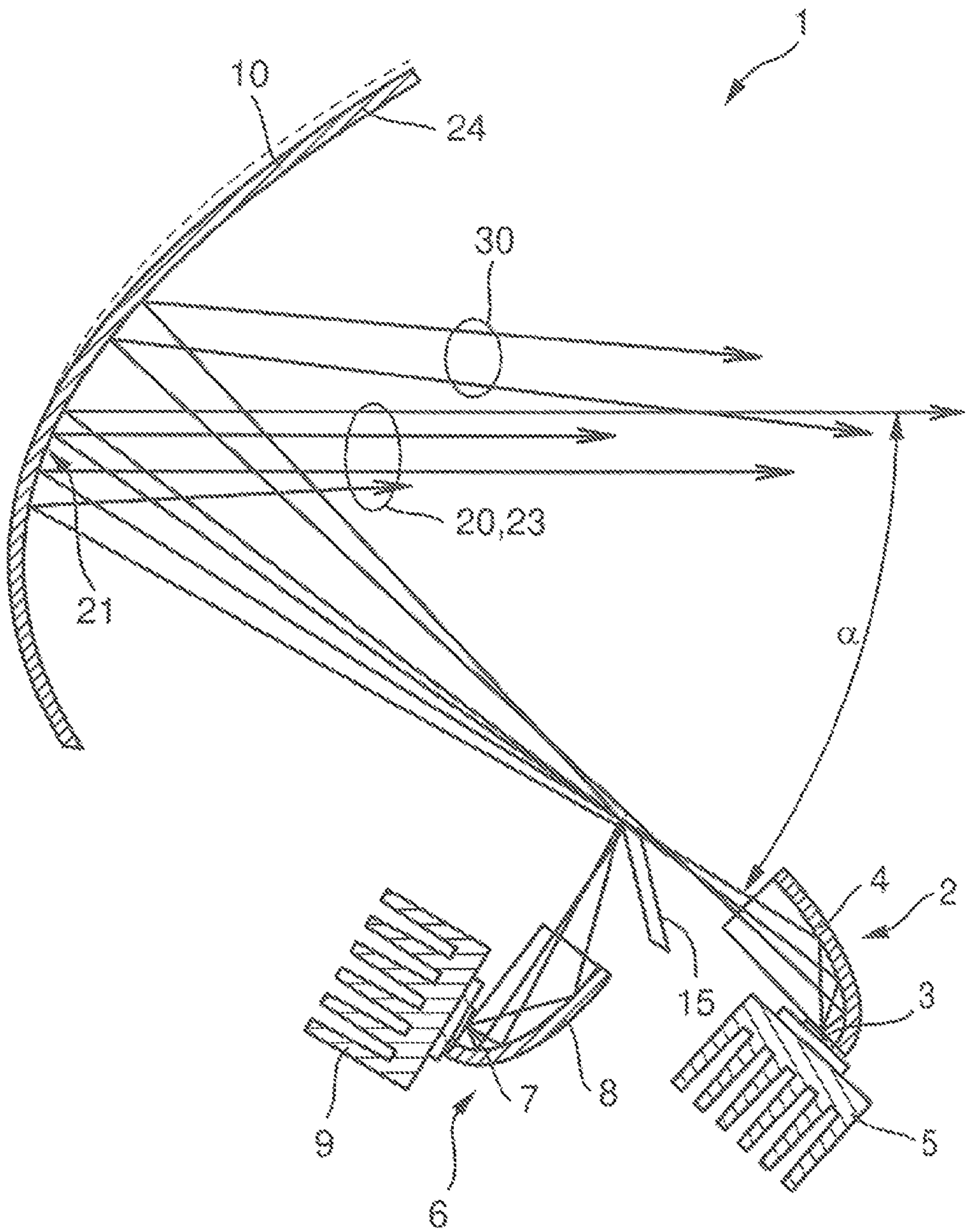
FIG. 10 shows a further embodiment of an inventive light module.

FIG. 10 shows a further embodiment of the light module 1. In the process, the projection-lens system 10 is constructed as a concave mirror (in an embodiment, as a rotational parabolic-shaped concave mirror). The light emitted front the passing-light sub-module 2 largely passes by the deflecting element 15 and falls on a common segment 21 of the projection-lens system 10. The light produced by the high-beam sub-module 6 is split in the primary lens system 8 in such a way that a greater portion of the light after impinging on the deflecting element 15 and the deflection of the beam path in the direction of the projection-lens system 10 likewise falls on the common segment 21 of the projection-lens system 10. The passing-light beams 20 and the deflected high beams 23 radiate under an acute angle "α" into the concave mirror 10. A smaller portion of the light of the high-beam sub-module 6 falls after impinging on the deflecting element 15 and the deflection of the beam path in the direction of the projection-lens system 10 on a different segment 24 next to or beyond the common segment 21 on the projection-lens system 24. This other segment 24 includes a deflector that deflects at least a portion of the light beams impinging on the segment 24 downward and, thus, produces the deflected light bundle 30. In the embodiment, the deflector is constructed by deforming or reforming of the rotational paraboloid 10—in particular, as a deformed parabolic reflector. In this case, the beam path is deflected through the concave mirror in acute angle "α."

Figure 11:
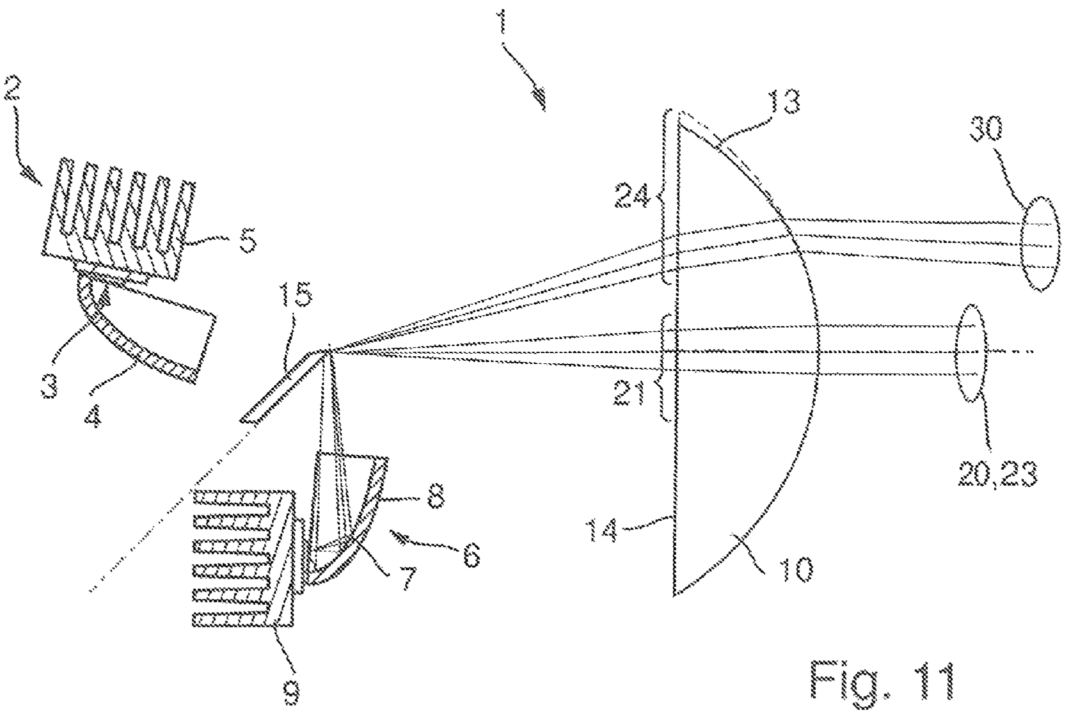
FIG. 11 shows a further operating mode of the light module from FIG. 1.

In FIG. 11, a further operating mode of the light module from FIG. 1 is shown. In contrast to the operating mode from FIG. 2*b*, however, the common segment 21, upon which a majority of both the passing-light beams 20 of the passing-light sub-module 2 and the high beams 23 of the high-beam sub-module 6 falls, is constructed in a central region of the projection lens 10. The other segment 24, upon which a smaller portion of the high beams 23 falls, is arranged on the edge—in particular, on the upper edge of the lens 10. The deflector is provided in the segment 24, the deflector deflecting at least a portion of the light beams 23 passing through the segment 24 downward. In contrast to the embodiment from FIG. 4*c* right, the course of the light-exit surface 13 of the lens 10 is modified such that an enlarged prism angle arises. The light bundle lowered thereby is indicated at 30.

Figure 12:
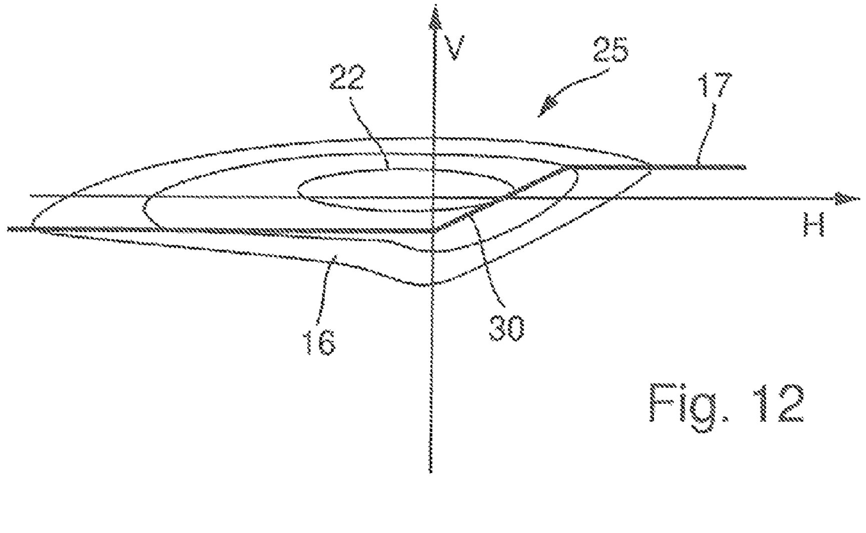
FIG. 12 shows an overall light distribution produced with an inventive light module.

In FIG. 12, an overall light distribution 25 on a measuring-screen is shown, such as can be produced with the light module 1. The resulting overall light distribution 25 includes the passing-light distribution 16 with a horizontal "light/dark" boundary 17 and the high-beam light distribution 22 essentially above the "light/dark" boundary 17. The light bundle 30 vertically deflected by the deflector in segment 24 of the projection-lens system 10 reaches the region of the "light/dark" boundary 17 or below on the measuring screen. The light reproduced by the common optical segment 21 is at all events collimated, but not deflected. Only the light mirrored through the other optical segment 24 is deflected downward.

The invention has been described above in an illustrative manner. It is to be understood that the terminology that has been used above is intended to be in the nature of words of description rather than of limitation. Many modifications and variations of the invention are possible in light of the above teachings. Therefore, within the scope of the appended claims, the invention may be practiced other than as specifically described above.

What is claimed is:

1. A light module of a lighting device of a motor vehicle comprising:

at least one passing-light sub-module for production of a low beam light distribution substantially below an essentially horizontal "light/dark" boundary and having a first optical axis;

at least one high-beam sub-module for production of a light distribution substantially above the "light/dark" boundary and having a second optical axis wherein said first and second optical axes are disposed in non-parallel relationship with respect to each other;

a common optical projection system that is a reflector for projecting light beams of the at least one passing-light sub-module and the at least one high-beam sub-module in front of the motor vehicle for production of a desired resulting overall light distribution of the light module; and at least one deflecting element that deflects a course of the light beams of at least one of the at least one passing-light sub-modules and the at least one high-beam sub-module before the respective light-beams courses fall onto the common optical projection system, wherein said at least one deflecting element may be chosen from a group including a prism, a double prism, or a roof edge mirror; and wherein the deflecting element and the light sub-modules are arranged in respect to one another such that a virtual mirror image of at least one of the light sub-modules is created by means of the deflecting element, in order to give the impression that one of the light sub-modules and the virtual image of the other light sub-modules or the virtual images of both light sub-modules are located congruently in the same position within the light module.

2. The light module according to claim 1, wherein a common segment is arranged around an optical axis of the optical projection system.

3. The light module according to claim 1, wherein another segment is arranged at a distance to an optical axis of the optical projection system.

4. The light module according to claim 3, wherein said another segment is arranged at at least one of an upper and a lower edge of the optical projection system.

5. The light module according to claim 1, wherein at least one of the passing light sub-module and the high-beam sub-module includes at least one LED-light source for emitting light for the production of the light distributions and at least one primary optic system for bundling of the emitted light before the emitted light falls on the optical projection system.

6. The light module according to claim 5, wherein the at least one primary optic system is a reflector.

7. The light module according to claim 5, wherein the at least one primary optic system is a solid light-conducting body made of a translucent material into which light enters via at least one light-entry surface, the light is totally reflected some times at at least one boundary of the solid light-conducting body and exits via at least one light-exit surface, and the light emitted by said at least one LED-light source is bundled by at least one of a refraction at at least one of the light-entry surfaces or the at least one of the light-exit surfaces or a total reflection at the boundary.

8. The light module according to claim 5, wherein at least one of the passing-light sub-module and the high-beam sub-module includes at least one primary optic system for bundling of the emitted light before the emitted light falls on the optical projection system, wherein the at least one deflecting element is designed separately from the at least one primary optic system.

9. The light module according to claim 1, wherein the at least one deflecting element includes a deflecting mirror with an edge and the optical projection system reproduces the edge as the “light/dark” boundary in front of the motor vehicle.

10. The light module according to claim 1, wherein the at least one deflecting element includes a prism with an edge and the optical projection system reproduces the edge as the “light/dark” boundary in front of the motor vehicle.

* * * * *

UNITED STATES PATENT AND TRADEMARK OFFICE

CERTIFICATE OF CORRECTION

PATENT NO. : 9,255,683 B2
APPLICATION NO. : 13/793873
DATED : February 9, 2016
INVENTOR(S) : Matthias Brendle It is certified that error appears in the above-identified patent and that said Letters Patent is hereby corrected as shown below:

On the title page
Item (72) Inventor: delete “Tuebinger” and insert therefor --Tuebingen--.

Signed and Sealed this
Ninth Day of August, 2016

Michelle K. Lee
*Director of the United States Patent and Trademark Office*